July 1, 1924.

A. P. PAINE

HANDLAMP

Filed June 9, 1920

Inventor
Arthur P. Paine,
By
his Attorney

July 1, 1924.

A. P. PAINE

HANDLAMP

Filed June 9, 1920

Inventor
Arthur P. Paine,
By
his Attorney

July 1, 1924.

A. P. PAINE 1,499,591

HANDLAMP

Filed June 9, 1920

Inventor
Arthur P. Paine
By
Attorney

Patented July 1, 1924.

1,499,591

UNITED STATES PATENT OFFICE.

ARTHUR P. PAINE, OF NEW HAVEN, CONNECTICUT, ASSIGNOR TO WINCHESTER REPEATING ARMS COMPANY, OF NEW HAVEN, CONNECTICUT.

HANDLAMP.

Application filed June 9, 1920. Serial No. 387,657.

*To all whom it may concern:*

Be it known that I, ARTHUR P. PAINE, a citizen of the United States, residing in the city of New Haven, county of New Haven, and State of Connecticut, have invented certain new and useful Improvements in Handlamps, of which the following is a full, clear, and exact description.

This invention relates to hand lamps and it pertains more especially to hand lamps or so-called flash-lights of the type wherein one or more electric dry cells are housed within a tubular insulating casing carrying a miniature incandescent bulb adapted to be placed in circuit with the cell or cells by the operation of a switch conveniently located at the exterior of the casing for manual operation. Certain features of the invention are applicable, however, to hand lamps of other types.

The invention also has more particular reference to hand lamps of the type wherein a three-position switch is employed, having a movable element which assumes one position for flashing, another position for permanent lighting, and a third position termed the "safety" position, in which the switch is locked in an inoperative condition. In certain phases of the invention, however, it is unnecessary to give the switch three distinct positions, as some features of my improvements may be employed to advantage in a two-position or other switch.

One of the primary objects of the invention is the provision of a hand lamp of the insulating casing type having improved means for closing and opening the circuit through the incandescent bulb.

Another object of the invention is to furnish simple and efficient switch mechanism for hand lamps.

I have in view also the provision of means whereby accidental lighting of the lamp, when the movable switch element is in the "safety" position, is provided in an especially effective manner.

My invention also provides a reliable, efficient, three-position switch structure for devices of the class to which I have referred.

To these and other ends the invention consists in the novel features and combinations of parts to be hereinafter described and claimed.

Figure 1:
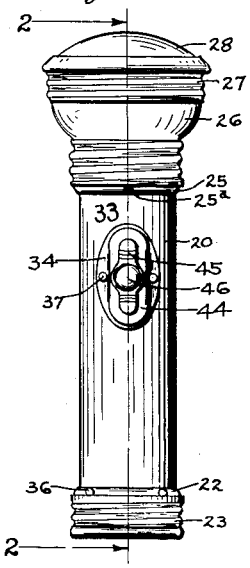
Fig. 1 is an elevation of a tubular hand lamp embodying my improvements.
Figure 2:
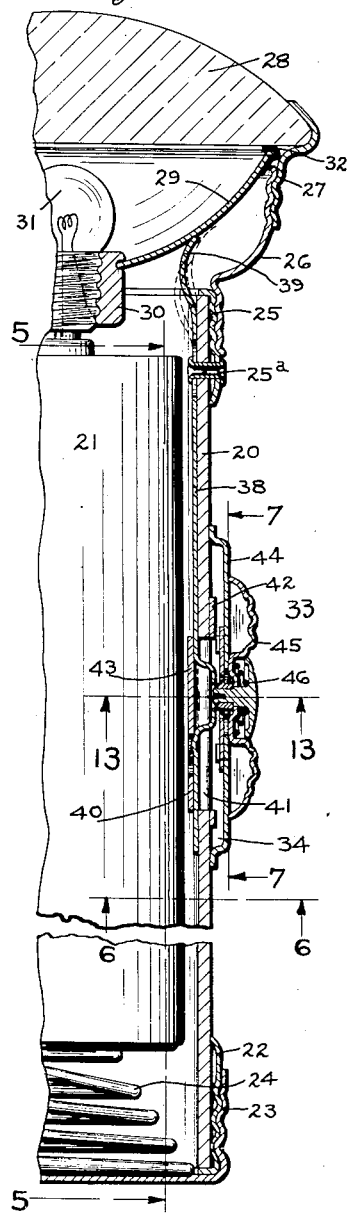
Fig. 2 is a fragmentary central longitudinal section of the device on a larger scale, showing the switch in the flash position.
Figure 7:
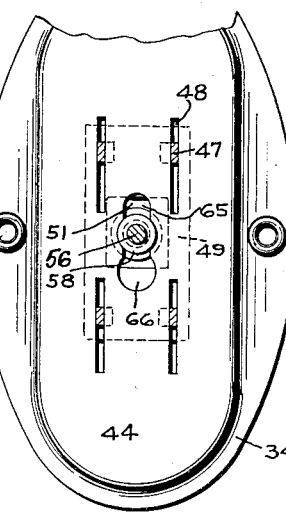
Fig. 7 is a section on line 7—7 of Fig. 2, on a larger scale.
Figure 8:
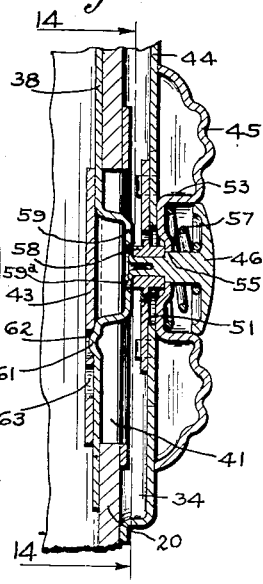
Fig. 8 shows certain parts of Fig. 2 on a larger scale.
Figure 9:
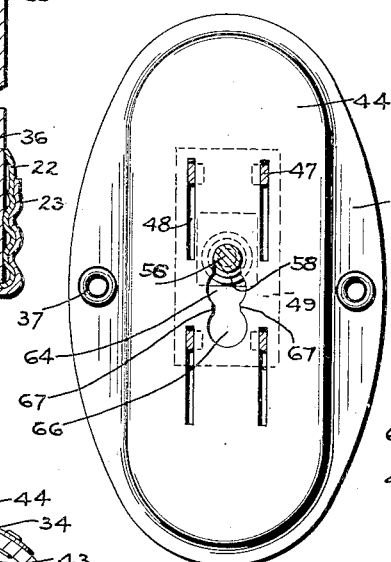
Figure 10:
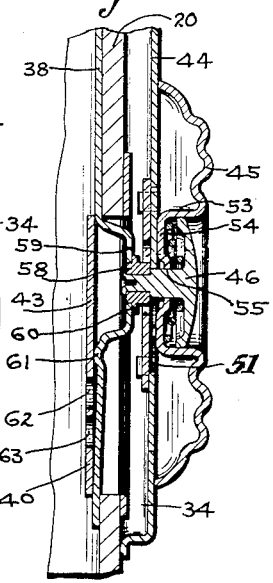
Figure 6:
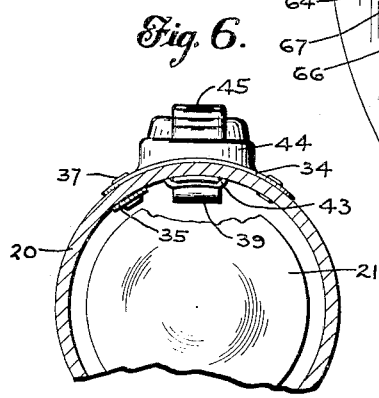
Fig. 6 is a section on line 6—6 of Fig. 2.
Figure 11:
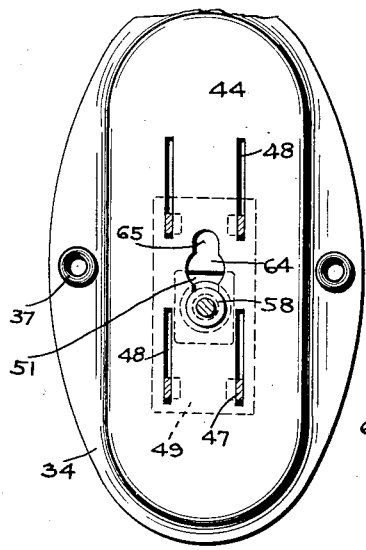
Figure 12:
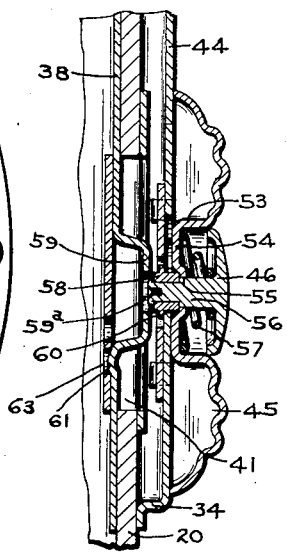
Figure 14:
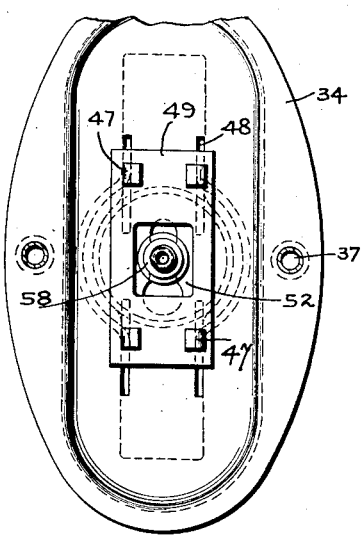
Figure 15:
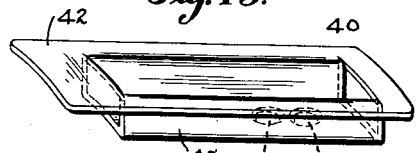
Figure 17:
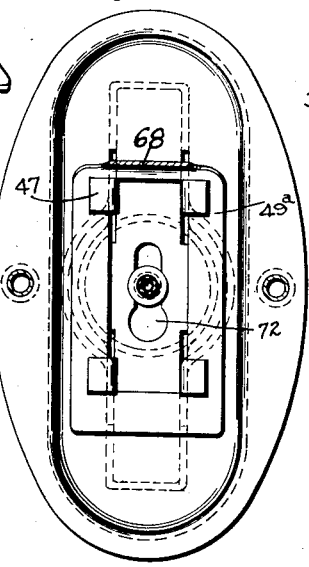
Figure 16:
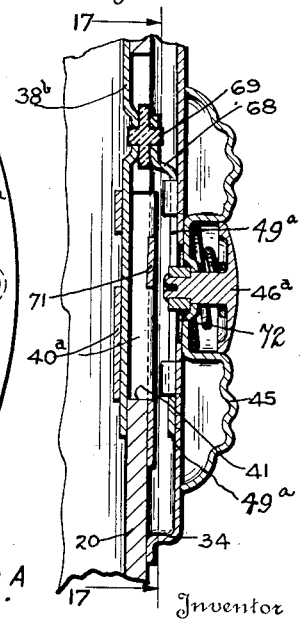
Figure 13:
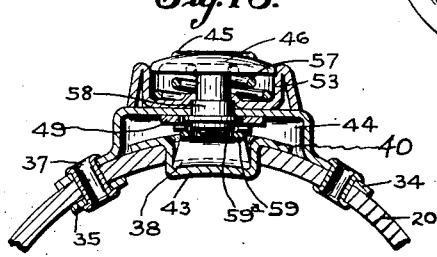

Figs. 9 and 10 correspond to Figs. 7 and 8 respectively, but show the permanent light position;

Figs. 11 and 12 correspond to Figs. 7 and 8 respectively, but show the safety position;

Fig. 13 is a section on line 13—13 of Fig. 2, on a larger scale;

Fig. 14 is a bottom view of the switch base plate;

Fig. 15 is a detail perspective view of the guide for the inner end of the movable contact strip;

Fig. 16 is a detail section of a switch structure of somewhat modified form;

Fig. 17 is a section on line 17—17 of Fig. 16; and

Figures 18, 19:
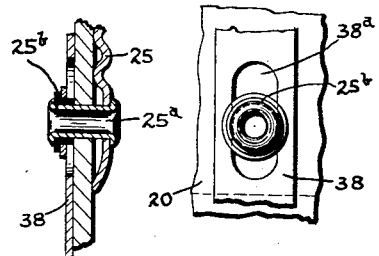

Figs. 18 and 19 show a modified form of guide for the outer end portion of the movable contact strip.

I have shown my improvements applied to a tubular hand lamp of the miner's type, having a casing 20 of fibre or like insulating material, containing the usual dry cells 21. At the rear end of the casing the same is provided with the customary threaded ferrule 22, onto which screws the ordinary end cap 23, carrying a spring 24 that presses against the bottom of the rear cell.

The cells, of which there are two in the embodiment illustrated, are encased in the customary paper insulating wrapper. At the front end the casing is furnished with a metal ferrule 25 held in place by a plurality of rivets 25ᵃ passing through the fibrous casing; and on the ferrule 25 is screwed a lens shell 26, having screw threads pressed in its outer end portion so that the lens holder 27 may be screwed on the same. The lens holder supports the lens 28 and between the lens and the front end of the casing is a reflector 29 having a metal socket 30 at its inner part for the reception of the lamp bulb 31. In the form shown in Fig. 2 the reflector 29 is interposed between the rear surface of the lens, at the periphery of the latter, and the front edge of the lens shell 26, but is out of contact with said shell, and where the reflector would otherwise contact with the holder 27 the former carries an edge binding 32 of insulating tape or the like, so that the reflector is insulated from the metal parts carried by the front end of the casing. The bulb 31 is arranged in the usual manner within the metal socket 30 and makes contact in the ordinary way with the central electrode of the front battery cell.

Figure 5:
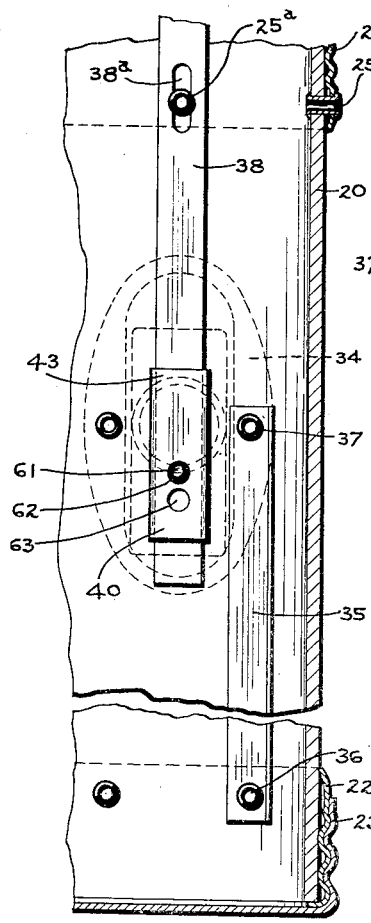
Fig. 5 is a fragmentary interior view of the casing.

Located on the exterior of the fibre casing about midway of the length thereof is a metal switch structure 33, by which the circuit containing the lamp and dry cells is adapted to be closed. This switch structure includes a sheet metal base plate or member 34, which serves as a guide for a combined slide and push button, as hereinafter described. The base plate is electrically connected in a suitable manner, as by means of a brass conductor strip 35, with the uncovered bottom portion of the rear cell. Preferably the connection is from the cell to the spring 24 and thence to the end cap 23 and ferrule 22, to which the conductor 35 may be riveted, as shown in Fig. 5, the rivet connection being adjacent the rear end of the conductor strip, as shown at 36, and the conductor strip having at its opposite end a similar rivet connection 37 with the base plate 34 of the switch, as shown in Fig. 5. From the central electrode of the front cell the circuit passes through the bulb 31 to the socket 30, through a portion of the reflector 29 and thence through a conductor strip 38 to the movable part of the switch structure 33, as hereinafter described.

The conductor strip 38 is formed and arranged in a novel manner, as follows: This strip, which may be conveniently made of thin brass, is arranged within and along the side wall of the fibre casing, extending longitudinally thereof, and is mounted to slide lengthwise relatively to the casing. Near its outer end portion the strip may be guided for longitudinal movement by one of the rivets 25ª previously mentioned, which projects through a slot 38ª in the forward end portion of the strip. The inner end of the rivet 25ª extends over the edges of the slot 38ª, as shown in Fig. 5, and supports and guides the strip for movement lengthwise of the casing. At its outer end the strip 38 is curved, as shown at 39, so that the tip or extremity of the strip is adapted to contact flatwise with the outer surface of the reflector 29 at say a point about midway between the periphery of the reflector and its central axis. When the contact strip is in the position shown in Fig. 2 the same will make effective contact with the reflector when the latter is placed in position. In doing this the reflector is placed within the lens shell 26, the lens being then applied by means of its holder 27, and the reflector is pressed by the operation of assemblage against the curved end portion of the strip so as to make effective contact therewith. It will be understood that the contact between the strip and reflector is maintained irrespective of the turning movement of the lens holder, within certain limits, and that the assemblage of the parts to bring about contact between the reflector and the contact strip may be readily effected.

At its inner end portion the strip 38 is guided in a guide member 40, located adjacent a solt 41 in the fibre casing beneath the base plate 34. This guide 40 is shown in detail in Fig. 15 and it will be observed, has a rim portion 42 extending around the slot 41 at the outside of the casing and a downwardly bent guide or keeper portion 43 which is located within the casing opposite the slot. The inner end portion of the contact strip 38 is held in place by the member 40, being confined between the keeper 43 and the inner surface of the casing wall in such a manner as to have little or no play in a radial direction, although the strip is free to be slid lengthwise. The strip is of such length that its inner end passes beyond the slot 41 in all positions of the strip, the inner extremity bearing against the inner surface of the casing.

The switch base plate 34 is shaped to conform to the casing. It is preferably stamped out from sheet metal and has a raised longitudinal projection 44 which serves as a guide for a slide piece 45 carrying a central push button 46. The guide projection 44 has a flat outer face provided with suitable slots for positioning and guiding the slide 45. In the forms shown, the slide 45 is of elongated shape lying centrally of the projection 44 of the base plate and adapted to slide forwardly and rearwardly thereon to a limited extent. The slide is preferably constructed of sheet metal with a channeled cross section, having integral top and side walls. At its front and rear extremities the outer wall is bent down so as to approach the adjacent part of the base plate at an acute angle. The side walls of the slide near the corners of the latter are continued downwardly to form securing and guiding lugs or projections 47 which pass through longitudinal slots 48 in the base plate and are bent laterally beneath the base plate so as to hold the slide in place. In the particular form shown in detail in Fig. 14, a rectangular member 49 is positioned at the under surface of the guiding projection 44 and the lugs 47 pass through correspondingly shaped holes in the same and are bent inwardly over the face of said rectangular member. In this manner the member 49 is made a part of the sliding structure, its whole upper face bearing against the under surface of the guide projection 44, whereby a substantial bearing of the slide on the base plate is afforded. Preferably the upper or outer surface of the slide is furnished with serrations in order to provide an effective grip, said serrations being created by the transverse depressions or grooves in the sheet metal, as shown.

At the central part of the base plate 34 beneath the slide 45, said plate is provided with a slot 51 of special form, as hereinafter described. This slot is directed lengthwise of the guide projection 44. The bearing member 49 of the slide structure is provided with a central opening 52 which clears the push button device 46 which is carried by the slide 45 and is adapted to co-operate with the contact strip 38. The push button is located within a cylindrical socket 53 in the slide 45. The central part of the slide has a slight depression therein and the socket 53 is located within this depression. This socket is formed by punching in the outer wall of the slide and it has a bottom wall 54 with a perforation 55 in which the shank 56 of the push button 46 is guided for movement in an inward and outward direction. The push button preferably has a mushroom head cut away at its under part, as shown in Fig. 12, to provide an annular seat for a spring 57. The shank 56 of the button is preferably integral with the head and at its inner end it is of reduced cross section so as to receive a flange or collar 58 which is riveted in place by upsetting the inner extremity of the button shank. The spring 57 is interposed between the bottom of the button socket 53 and the head of the button.

The collar or flange 58 on the button shank serves as a movable contact member, co-operating with the strip 38, for which purpose said strip is provided with a bowed portion 59 extending within the slot 41 and having a perforation 59ª in which the inner part of the contact member 58 is adapted to fit. Above the bowed portion 59 the member 58 is provided with a small annular rib 60, which abuts the upper surface of the contact strip around the perforation 59ª when the button 46 is depressed.

In the flash position shown in Fig. 2, the bowed portion 59 of the contact strip lies opposite the button 46, as shown in Fig. 8, with the hole 59ª in line with the button shank. The spring 57 normally holds the contact member 58 out of contact with said bowed portion. The contact strip is yieldingly held in position by a small projection 61 on the strip engaging an opening 62 punched in the guide member 43. The projection 61 is also adapted to engage another opening 63 located adjacent the opening 62 but nearer the butt end of the casing. By engaging one or the other of the openings 62, 63, the projection 61 holds the contact strip 38 against accidental displacement.

In the flash position, the contact member 58 is located within the central part 64 of the slot 51 previously mentioned. This central part 64 is of the shape shown in Fig. 9, conforming to the member 58 but clearing the same so as to permit a depression of the button. When the button is depressed by the thumb of the operator the member 58 is carried into contact with the bowed portion of the contact strip 38 whereby the circuit is completed in an obvious manner. In front of the central portion 64 the slot 51 is narrower, as shown for example at 65 in Fig. 11, this portion 65 being of a shape, size and location whereby it is adapted to conform to the shank portion of the button above the contact member 58. Back of the central portion 64 of the slot 51 is an enlarged end portion 66 (Fig. 9) of about the same size as the portion 64. Between the portions 64 and 66 are inwardly directed projections 67, which are spaced apart a distance corresponding substantially to the diameter of the main part of the button shank 56.

The operation of the device is as follows: The manner in which the parts function when the switch is in the flash position has already been described. It is merely necessary to depress the button so as to carry its inner end into contact with the member 38. When the pressure of the thumb is released the spring 57 returns the button to the initial position. Suppose now that it is desired to keep the lamp lighted for several minutes without using the hand for that purpose, it is merely necessary for the operator to depress the button 46 so that the contact member or projection 58 will move into the opening 59ª of the contact member 38, whereupon the thumb is used to give a forward pushing impulse to the slide 45. This carries the button into the position shown in Figs. 9 and 10, which is the permanent light position. In this position the contact of member 58 with the contact strip 38 is maintained, as shown in Fig. 10, in opposition to the spring 57, the lower or inner part of member 58 being held tightly in the opening 59ª with the rib 60 tightly engaging the upper surface of the contact strip around said opening 59ª. This engagement is maintained owing to the fact that the top or outer surface of member 58 is engaged with the base plate around the edge of the narrow portion of the slot 51. In order to shut off the light the slide is moved back to the initial position so that the button shank is released and the button spring then carries the button out of contact with the strip 38.

When the contact strip 38 is thrust forward in moving the combined slide and push button structure from the flash position to the permanent light position, the forward extremity 39 of said strip is thrust forwardly and outwardly to a slight extent with reference to the reflector, but the contact between the strip and the reflector is maintained without any substantial change. In other words the same kind of contact will be afforded between the parts in question, but the contact will be at a slightly different point on the reflector surface.

When it is desired to move the switch to the safety position, in which the parts are locked in such position as to break the circuit, the combined push button and slide is moved from the position shown in Fig. 8 to that shown in Figs. 11 and 12. To accomplish this the operator pushes inwardly on the button 46 so that the contact projection 58 will clear the projections 67, and the slide is then pushed or pulled rearwardly with the projection 58 in engagement with the hole 59ᵃ of contact member 38 until the button comes opposite the center of the slot portion 66. The pressure on the button then being removed, the contact member 58 moves upward again out of the opening 59ᵃ, so that contact between the member 38 and the member 58 is interrupted. The rib 60 on the member 58 abuts against the under surface of the base plate and the upper part of the contact member 58 fits snugly in the portion 66 of the slot 51. In this position it is impossible to release the button without depressing the same, owing to the fact that forward movement of the button shank is blocked by the projections 67.

Figure 4:
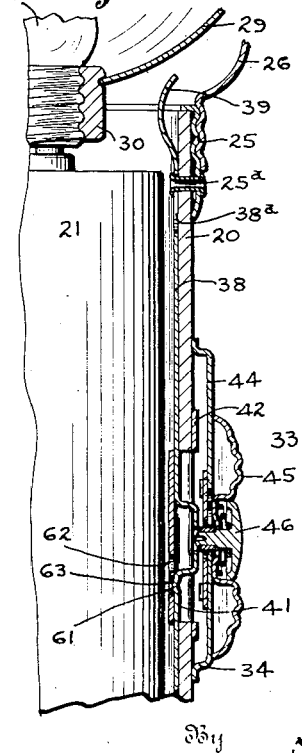
Fig. 4 is a view similar to Fig. 3, showing the switch in the safety position.
Figure 3:
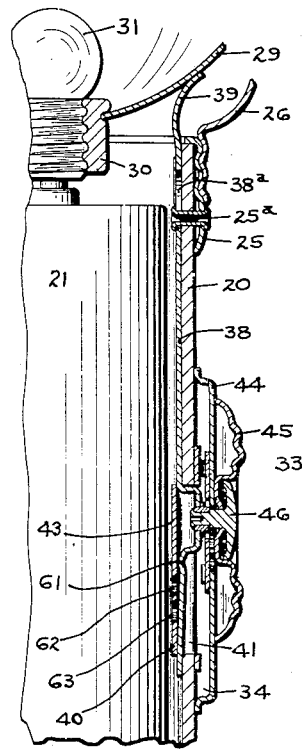
Fig. 3 is a view similar to Fig. 2, but showing fewer of the parts, the switch being in the permanent light position.

In the safety position just referred to, the interruption of the circuit is made doubly sure because there is not only a gap between the member 58 and the bowed portion 59 of the movable contact strip, but there is also a gap between the forward extremity 39 of the strip 38 and the reflector 29, as shown more particularly in Fig. 4. In other words the movable strip 38 in being carried from the position shown in Fig. 2 to that shown in Fig. 4, is moved altogether out of engagement with the reflector so that these parts are no longer in electrical contact. The strip 38 is effectively secured in the position shown in Fig. 4 against accidental displacement by the engagement of the projection 61 on the strip with the opening 63 in the keeper. Thus the strip is effectively held in place and, owing to the fact that it cannot be carried forwardly again into engagement with the reflector without displacing the button 46, any accidental lighting of the bulb through movement of the switch parts under these conditions is prevented. However, when it is desired to move the switch into the flash position again, it is merely necessary to depress the button 46 so that it will disengage the projections 67 and engage the opening of the contact strip 38, whereupon the parts may be shifted to the position shown in Fig. 2. In this position the displacement of the contact strip is prevented by engagement of the projection 61 with the opening 62, as previously described. It is not necessary to provide special means for locking the contact strip to the keeper or other part when the parts are in the permanent light position, because at that time the strip is engaged with the contact button which in turn is held in position with sufficient security for permanent lighting by the engagement of the button in the forward end portion of the slot in the base plate of the switch.

All of the various movements of the switch can be carried out very easily and conveniently. In moving the slide forwardly and rearwardly a thrust in the proper direction may be exerted simultaneously with a downward thrust on the button. In moving forwardly from the flash position to the permanent light position the conductor 38 is moved with the movable element of the switch without, however, interrupting the flow of current between the conductor and the reflector or other fixed part with which the strip contacts. In order to move the parts into the permanent light position a depression of the switch button is necessary, as previously explained. A depression of said button is also necessary for moving the parts from the flash position to the safety position. The parts cannot be moved into or out of the safety position without a depression of the button. In moving from the flash position to the safety position the movable conductor is shifted rearwardly so as to break contact with the reflector and it will be understood that the strip has three distinct positions corresponding to distinct positions of the movable element of the switch. In two of these positions the strip makes contact with the reflector or other fixed part for carrying the current through to the switch but in the other position this contact is interrupted, and contact is also interrupted at the switch, in the safety position, so that the parts are held in the inoperative position at safety with double security.

If it be desired to insulate the exterior metal parts at the forward end of the casing so as to have them dead, the rivet 25ᵃ which serves as a guide for the movable contact member 38 may be insulated from said member by means of an insulating washer 25ᵇ, as shown in Figs. 18 and 19. In some cases also it may be desirable altogether to omit the guide from the front end portion of the movable contact strip.

In the modification shown in Figs. 16 and 17, the movable contact member, instead of being engaged and disengaged by the push button for the purpose of shifting said contact member, has a connection with the slide 45 of the switch structure. In this form, the movable strip is connected to and movable with a slide member 49ᵃ somewhat similar to the member 49 previously described. This member 49ᵃ is generally rectangular in shape and has an opening therein into which the lugs 47 of the slide project, these lugs being bent outward and clinched against the bottom face of member 49ᵃ, as shown in Fig. 17, within the corners of the opening in said member. Thus the member 49ᵃ is rigidly secured to the slide 45. At its forward portion the member 49ᵃ is bent downwardly, as shown at 68, and the downwardly bent portion is secured by means of a suitable insulating fastener 69 to the movable contact member 38ᵇ. In this form, that portion of the strip 38ᵇ located within the slot 41 of the fibre casing is perfectly plain. It is guided in a sheet metal lining member 40ᵃ in the slot 41, which lining member has portions against which the inner face of the contact strip 38ᵇ bears. The lining member also has a struck up bridge piece 71, extending transversely thereof about midway of its length. This bridge piece 71 serves as a stationary contact with which the inner end of the button 46ᵃ co-operates. The base plate of the switch has a locking slot 72 in which the inner end of the button shank operates.

The operation of this last described form of switch is as follows: When the parts are in the position shown in Fig. 16, which is the flash position, a depression of the button 46ᵃ carries the inner end of the button shank against the bridge piece 71, which is in electrical connection with the movable strip 38ᵇ, and hence the circuit is completed. For moving the switch to the permanent light position the button is depressed and its inner end is wedged in between the bridge piece 71 and the under surface of the base plate within the narrow portion of the slot 72. The slot 72 is of the same form as the slot 51 previously described and when the inner end of the button shank is wedged in place in the manner described the parts will be in position for permanent lighting. As the button and slide go forward the movable contact strip 38ᵇ goes forward with them in the manner previously described, owing to the connection of the strip with the sliding member 49ᵃ. In order to place the parts in the safety position from the flash position shown in Fig. 10, the button is depressed and moved rearwardly of the flash-light. This moves the forward end of the movable contact strip out of contact with the reflector, thus breaking the circuit. Then the contact member and slide are held in the rear safety position by the movement of the projection on the inner end of the button shank into the rear end portion of the slot 72 substantially in the manner previously described. In this safety position also the button is rearwardly displaced to such an extent that it will not make contact with the fixed contact member 71, and hence the circuit is interrupted at two points, as in the form first described.

The mechanism herein described has comparatively few parts and the same can be readily and economically manufactured and assembled. The device is also efficient and reliable.

Various changes may be made in the details of the construction without departing from the scope of the invention as defined in the claims.

I do not claim herein a hand lamp having a casing, a slide mounted on the casing and a longitudinally movable conductor strip within the casing and permanently connected to the slide, or other features claimed in my divisional application Serial No. 390,538, filed June 21, 1920.

What I claim is:

1. In a battery hand lamp, a casing, a battery therein, a bulb in said casing, means for making and breaking contact between the terminals of said bulb and battery, comprising a conductor member within the casing, and means mounting said conductor for movement to three distinct positions, to produce three distinct effects and means for completing the circuit through the bulb and battery in two of said positions without further circuit closing movement of the conductor member.

2. In a battery hand lamp, a casing, a battery therein, a bulb in said casing, means for making and breaking contact between the terminals of said bulb and battery, comprising a conductor member within the casing, and means mounting said conductor for movement to three distinct positions, to produce three distinct effects and means to flash the lamp in one of said positions without further movement of the conductor member.

3. In a hand lamp, a casing, a battery therein, a bulb in said casing, and means for making and breaking contact between the terminals of the bulb and battery comprising a longitudinally movable conductor strip within the casing, having in intermediate flash position, and means to move said strip from that position in opposite directions respectively to two other positions corresponding to permanent light and safety positions.

4. In a hand lamp, a casing, a battery therein, a bulb in said casing, and means for making and breaking contact between the terminals of the bulb and battery comprising a conductor strip within the casing movable lengthwise thereof to make and break the contact, and having three distinct positions longitudinally of the casing corresponding to safety, flash and permanent light positions respectively.

5. In a hand lamp, a casing, an electric battery therein, a bulb in said casing, and connections between the bulb and the battery, comprising a longitudinally movable conductor strip and a combined depressible contact button and slide structure cooperating with said conductor strip.

6. In a hand lamp, a casing, a battery therein, a bulb, and connections between the bulb and battery, including a bodily movable switch, said switch comprising relatively fixed and movable contacts.

7. In a hand lamp, a casing, a battery therein, a bulb, and connections between the battery and bulb, comprising a movable switch mechanism having three distinct positions to produce three distinct effects, and including a conductor element within the casing, said switch mechanism having relatively fixed and movable contacts.

8. In a hand lamp, a casing, a battery therein, a bulb, and connections between the bulb and battery, comprising a switch movable lengthwise of the casing and including a conductor strip controlled by and movable with said mechanism, said switch having relatively fixed and movable contacts.

9. In a hand lamp, a casing, a battery therein, a bulb, and connections between the bulb and battery, comprising a movable switch mounting having a switch element, movably mounted thereon, mounted on the outside of the casing, and a contact member controlled by said structure and located within and movable lengthwise of the casing.

10. A battery hand lamp having a contact device movable to a plurality of positions, including flash and safety positions, means for breaking the circuit at two distinct points in the safety position thereof, one of said means being operable to momentarily make and break the circuit to flash the lamp.

11. A battery hand lamp comprising a case, a bulb and battery therein, and means for closing the circuit through the bulb and battery including a movable contact device mounted on the case, said device comprising two relatively movable contact members whereby the circuit may be broken in more than one point.

12. A battery hand lamp comprising a case, a bulb and battery therein, and means for closing the circuit through the bulb and battery including a movable contact device mounted on the case, said device comprising two relatively movable contact members, and means for locking said device in a safety position wherein the circuit is broken in more than one point.

13. A hand lamp, having a contact device, means for moving said device into a flash position, a permanent light position and a safety position, and means for interrupting the circuit at more than one point in the safety position.

14. In a hand lamp, a casing, a battery therein, a bulb, and means for making and breaking the circuit through the battery and bulb comprising a movable contact member, and means on the casing capable of being placed into and out of engagement with said member to control the movement thereof and to complete the circuit therethrough.

15. In a hand lamp, a casing, a battery therein, a bulb, and means for making and breaking the circuit through the battery and bulb including a movable conductor member within the casing, an operating device mounted on the casing by which said conductor member may be moved, said device having a movement independent of said conductor member to close the circuit therethrough.

16. In a hand lamp, an insulating casing, a battery therein, a bulb, and means for making and breaking contact between the battery and the bulb, comprising a bodily movable switch on the casing including a movable conductor member within the casing.

17. In a hand lamp, an insulating casing, a battery therein, a bulb, a sliding conductor member mounted on the inside of the casing, a switch element on the casing for controlling said conductor member and movable independently thereof to make and break the circuit through said member.

18. In a hand lamp, an insulating casing, a battery therein, a bulb, and connections between the bulb and battery, including a switch element on the casing a conductor member within the casing movable by said switch element in opposite directions, respectively, from an intermediate position and means for preventing accidental movement of said member.

19. In a hand lamp, an insulating casing, a battery therein, a bulb, and connections between the battery and bulb, including a switch device on the casing having a movable element movable to three distinct positions, corresponding respectively to flash, permanent light and safety, and means providing for an interruption of the circuit at more than one point in the safety position, comprising a movable conductor strip within the casing.

20. In a hand lamp, an insulating casing, a battery therein, a bulb, and connections between the battery and bulb, including a switch device on the casing having a movable element movable to three distinct positions, corresponding respectively to flash, permanent light and safety, and means providing for an interruption of the circuit at more than one point in the safety position, comprising a movable conductor strip within the casing, adapted in the safety position to break the circuit adjacent the switch element and adjacent one end of the casing.

21. In a hand lamp, an insulating casing, a battery therein, a bulb, and connections between the battery and bulb, including a switch element on the casing, means mounting said element thereof for movement in opposite directions from an intermediate flash position to a permanent light position and to a safety position, a conductor member within the casing and means to connect said conductor member to said element for movement therewith.

22. In a hand lamp, a casing of insulating material, a battery therein, a bulb, connections between the battery and bulb including a movable conductor strip within the casing, and manually controlled means adapted to make contact with said strip to light the bulb momentarily in one position thereof and to light it permanently in another position.

23. In a hand lamp, a casing of insulating material, a battery therein, a bulb, connections between the battery and bulb including a movable conductor strip within the casing, and manually controlled means adapted to make contact with said strip to light the bulb momentarily in one position thereof, said means being ineffective to light the bulb in another position thereof.

24. In a hand lamp, an insulating casing, a battery therein, an incandescent bulb, and means for making and breaking contact between the terminals of the bulb and battery including a longitudinally removable conductor strip in the casing and a cooperating switch element on the casing slidable from an intermediate flash position in opposite directions respectively, to a permanent light position and to a safety position.

25. In a hand lamp, a casing, a battery therein, a bulb, connections between the battery and bulb, including a movable conductor strip within the casing, a slide to move said strip, and means to connect the slide with said strip and to disconnect it therefrom.

26. In a hand lamp, a casing of insulating material, a battery therein, a bulb, and connections between the battery and bulb, including a movable conductor strip within the casing, a slide upon the exterior of the casing normally disconnected from said strip, and means to connect the slide to the strip whereby the latter may be operated by the former.

27. In a hand lamp, a casing of insulating material, a battery therein, a bulb, and connections between the battery and bulb, including a movable conductor strip within the casing, a slide upon the exterior of the casing normally disconnected therefrom, and a switch member movably mounted on said slide to connect it to the strip.

28. In a hand lamp, an insulating casing, a battery therein, a bulb, a reflector in circuit with the bulb and located at one end of the casing, a contact device on the exterior of the casing permanently in circuit, a movable conductor strip interposed between the contact device and the reflector, and means for electrically connecting and disconnecting said contact device and conductor strip.

29. In a hand lamp, the combination of an insulating casing, a battery and a lamp therein, and a contact device for establishing a circuit through said battery and said lamp, comprising a housing secured to said casing, a sliding current carrying conductor strip within the casing, and a controlling element for said conductor strip associated with said housing and having means for locking it against movement except after an inward thrust thereon.

30. In a hand lamp, an insulating casing, a battery therein, a bulb, and connections between the battery and bulb, including a contact device on the casing, a lengthwise movable current carrying conductor strip within the casing, a controlling button for said strip associated with said contact device and locked against movement except after an inward thrust on the button.

31. In a hand lamp, a casing, a battery therein, a bulb, and electrical connections between the bulb and battery, including a contact device on the exterior of the casing permanently connected with the battery, a reflector in circuit with the bulb, a depressible button associated with said contact device, and a longitudinally movable conductor strip adapted to contact with the reflector and having means whereby the strip is engaged for completing the circuit by the inner end of the button shank.

32. In a hand lamp, a casing, a battery therein, a bulb, means establishing an electric circuit through said battery and bulb, said circuit including a mechanism movable to an interrupting position and including a circuit controlling switch.

33. In a hand lamp, a casing, a bulb, a battery therein, means for establishing by manual pressure a closed circuit, including said bulb and battery, involving in its structure a lengthwise movable strip mounted on the inner surface of the casing to move longitudinally of said casing, and movably mounted means adapted to contact with said strip for breaking the contact automatically on the release of the manual operating pressure.

34. In a hand lamp, a casing, a bulb, a reflector therefor, and a battery in said casing, means for establishing by manual pressure a closed circuit, including said bulb and battery, involving in its structure a lengthwise movable conductor strip mounted on the inner surface of the casing to move longitudinally thereof to make contact with said reflector, and movably mounted means adapted to contact with said strip for breaking the circuit automatically on the release of said manual operating pressure.

35. In a hand lamp, a casing, a battery therein, a bulb, and electrical connections including a movable conductor strip within the casing, a slide without the casing adapted to shift said strip lengthwise of the latter, and means, including a part movable on said slide, for locking the latter against movement.

36. In a hand lamp, a casing, a battery therein, a bulb, and electrical connections including a movable conductor strip within the casing, a slide without the casing adapted to shift said strip lengthwise of the latter, and means including a part movable on the slide for locking the latter against movement when it occupies either of two distinct positions.

37. In a hand lamp, a casing, a battery therein, a bulb, and electrical connections including a movable conductor strip within the casing, a slide without the casing for shifting said strip and a depressible member carried by the slide for flashing the bulb light.

38. In a hand lamp, a casing, a battery therein, a bulb, and electrical connections including a movable conductor strip within the casing, a slide without the casing for shifting said strip, and a depressible member on the slide for flashing the bulb light and for actuating the slide with the strip.

39. In a hand lamp, a casing, a battery therein, a bulb, and electrical connections including a movable conductor strip guided on the casing, a manually operable actuator for shifting said strip, and a light flashing device mounted on said actuator.

40. In a hand lamp, a casing, a battery therein, a bulb, and electrical connections between the battery and bulb including a movable conductor strip guided on the casing, a manually operable actuator for shifting said strip, and a combined light flashing and locking device mounted on said actuator.

41. In a hand lamp, a casing, a battery therein, a bulb, and electrical connections between said battery and bulb including a circuit conductor strip guided on the casing, an actuator for said strip, accessible at the exterior of the casing for manual operations, and a spring-pressed contact device mounted on said actuator for effecting the flashing of the bulb light.

42. In a hand lamp, a casing, a battery therein, a bulb, and electrical connections between said battery and bulb including a circuit conductor strip guided on the casing, an actuator for said strip, accessible at the exterior of the casing for manual operations, and a spring-pressed contact device associated with said actuator for effecting the flashing of the bulb light, said actuator and said contact device being operable concurrently by the thumb of the operator.

43. In a hand lamp, a casing, a battery therein, a bulb, and electrical connections between the battery and bulb, comprising a manually shiftable conductor strip guided on the casing for closing the circuit at one point, and self-returning contact means adapted for manual operation concurrently with the movement of said strip for flashing the bulb light.

In witness whereof, I have hereunto set my hand on the 4th day of June, 1920.

ARTHUR P. PAINE.